US 6,681,637 B2

(12) United States Patent
Jacob et al.

(10) Patent No.: US 6,681,637 B2
(45) Date of Patent: Jan. 27, 2004

(54) PRESSURE-MEASURING CELL WITH A TEMPERATURE SENSOR

(75) Inventors: Joern Jacob, Wolfach-Kirnbach (DE); Ewald Boehler, Wolfbach (DE); Manfred Liehr, Wolfbach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 09/905,941

(22) Filed: Jul. 17, 2001

(65) Prior Publication Data

US 2002/0124654 A1 Sep. 12, 2002

Related U.S. Application Data

(60) Provisional application No. 60/273,330, filed on Mar. 6, 2001.

(30) Foreign Application Priority Data

Jul. 20, 2000 (DE) .......................... 100 35 346

(51) Int. Cl.⁷ ............................................ G01L 19/04
(52) U.S. Cl. ............................. 73/708; 73/700; 73/706; 73/715
(58) Field of Search .................... 73/708, 706, 715, 73/724; 338/47; 361/47, 283

(56) References Cited

U.S. PATENT DOCUMENTS

| 4,603,371 A | * | 7/1986 | Frick .......................... 361/283 |
| 4,994,781 A | * | 2/1991 | Sahagen ....................... 338/47 |
| 5,712,428 A | * | 1/1998 | Schleiferbock .............. 73/708 |
| 5,824,909 A | * | 10/1998 | Kathan et al. ................ 73/706 |
| 6,363,790 B1 | * | 4/2002 | Flogel et al. ................. 73/708 |
| 6,393,919 B1 | * | 5/2002 | Ohji et al. .................... 73/708 |

FOREIGN PATENT DOCUMENTS

| DE | 38 17 336 | 12/1988 |
| DE | 88 15 425 | 5/1990 |
| DE | 40 11 901 | 10/1991 |
| DE | 41 11 118 | 10/1992 |
| EP | 0 764 839 | 3/1997 |

* cited by examiner

Primary Examiner—Edward Lefkowitz
Assistant Examiner—Alandra Ellington
(74) Attorney, Agent, or Firm—Nath & Associates PLLC; Marvin C. Berkowitz

(57) ABSTRACT

A pressure-measuring cell having a base and a diaphragm positioned on the base is deformed by a pressure being measured. A temperature-measuring sensor is positioned between the diaphragm and the base preferably embedded in a material layer that seals a compartment. The diaphragm is preferably made of a ceramic and the material layer is preferably made of a glass.

10 Claims, 2 Drawing Sheets

PRESSURE-MEASURING CELL WITH A TEMPERATURE SENSOR

Figure 1:
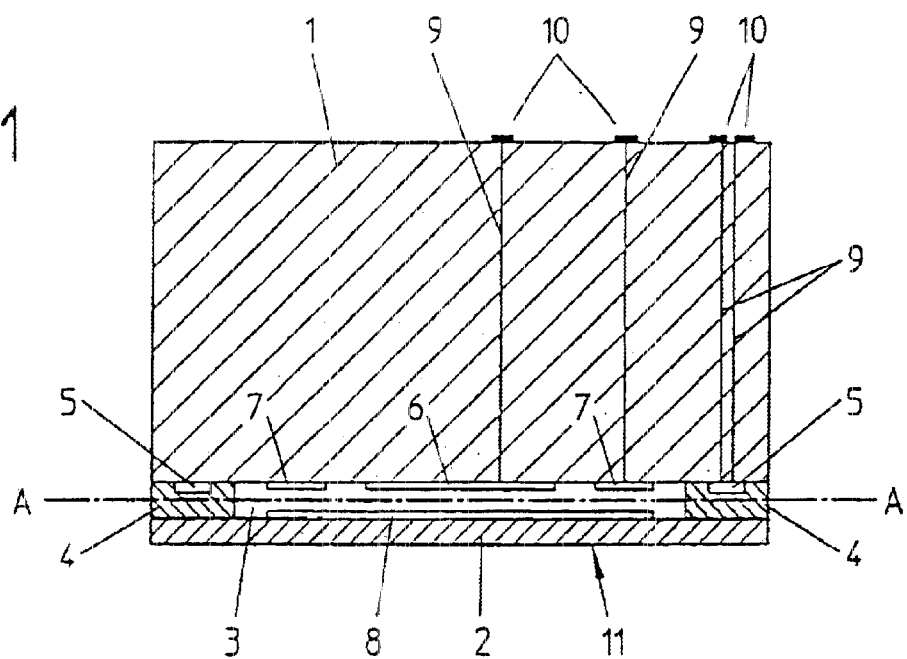

This application is a nonprovisional of U.S. provisional application No. 60/273,330 filed Mar. 6, 2001.

The present invention relates to a pressure-measuring cell with a temperature sensor. Temperature sensors are frequently integrated into pressure-measuring cells in order to compensate for the static temperature errors that arise in pressure measurement. In the case of ceramic pressure-measuring cells this temperature sensor is usually applied to the back of the ceramic piece, although it can also be contained in an adjoining electronic evaluating unit. A disadvantage of such pressure-measuring cells is that temperature changes in the medium whose pressure is to be measured—a medium which often acts with direct contact on the pressure-measuring cell—only have an effect on the temperature of the temperature sensor after a considerable delay, and at times in dampened fashion. Any resulting temperature deviation between the medium to be measured and the temperature sensor will lead to errors in the correction of the measured pressure value provided by the measuring cell.

In order to solve this problem the present invention proposes—in a pressure-measuring cell that exhibits a base as well as a diaphragm that is positioned on the base and that is deformed by the pressure to be measured—that a temperature sensor be positioned between the diaphragm and the base. This positioning guarantees that there is a slight distance between the temperature sensor and the medium that exerts a pressure on the diaphragm, so that the measured value of the temperature sensor is able to quickly follow temperature changes in the medium. As a result, the disruptive influence exerted by abrupt temperature changes in the medium on the pressure measurement is reduced considerably.

A typical separating distance between the temperature sensor and an outer diaphragm area that is exposed to the pressure being measured lies between 0.1 and 3 mm, depending on the thickness of the diaphragm, i.e., depending on the dimensions of the pressure-measuring cell or the pressures to be measured by the cell.

In order to assure an efficient heat transfer between the medium and the temperature sensor, it is advantageous to embed the sensor in a material layer that connects the base and the diaphragm.

In particular, it is advantageous to embed the sensor in a seal that seals a compartment formed between the base and the diaphragm.

In a sensor whose base and/or diaphragm consist of a ceramic material, this kind of seal will be advantageously formed by a glass.

The temperature sensor will expediently comprise a resistor element with temperature-dependent resistor. It is easy to manufacturer this kind of resistor element so that it has a flat shape.

In order to receive a temperature-measuring signal that is as large and noise-free as possible, it is expedient for the resistor element to extend over virtually the entire circumference of the measuring cell. A secondary effect of this configuration of the resistor element is that the temperature determined from the resistance value of the resistor element represents a mean value over basically the entire circumference of the diaphragm and thus very closely approaches a mean value over the entire surface of the diaphragm.

In order for it to be possible to house a long conductor for the resistor element on a given circumferential length of the seal, the resistor element will preferably have a meander-shaped design.

Figure 2:
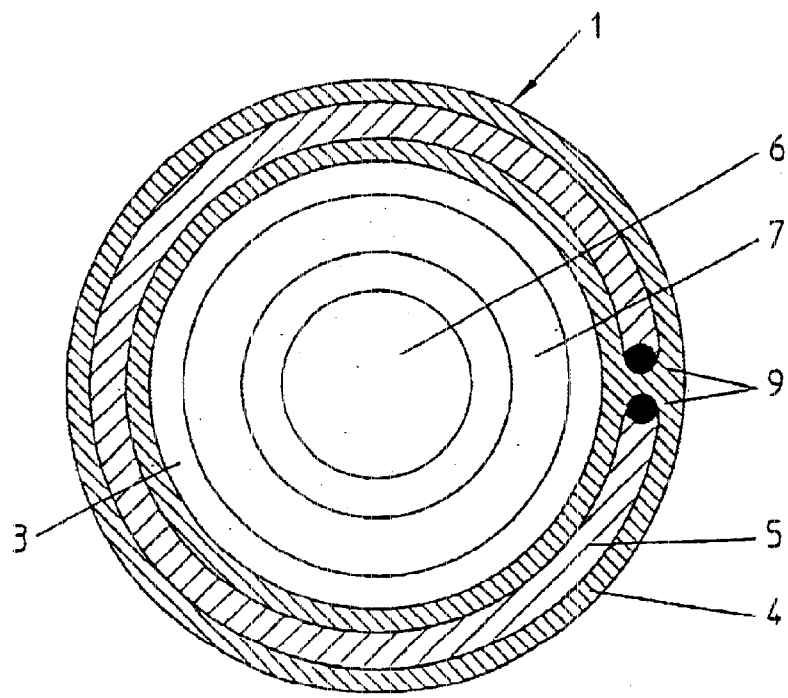
Figure 3:
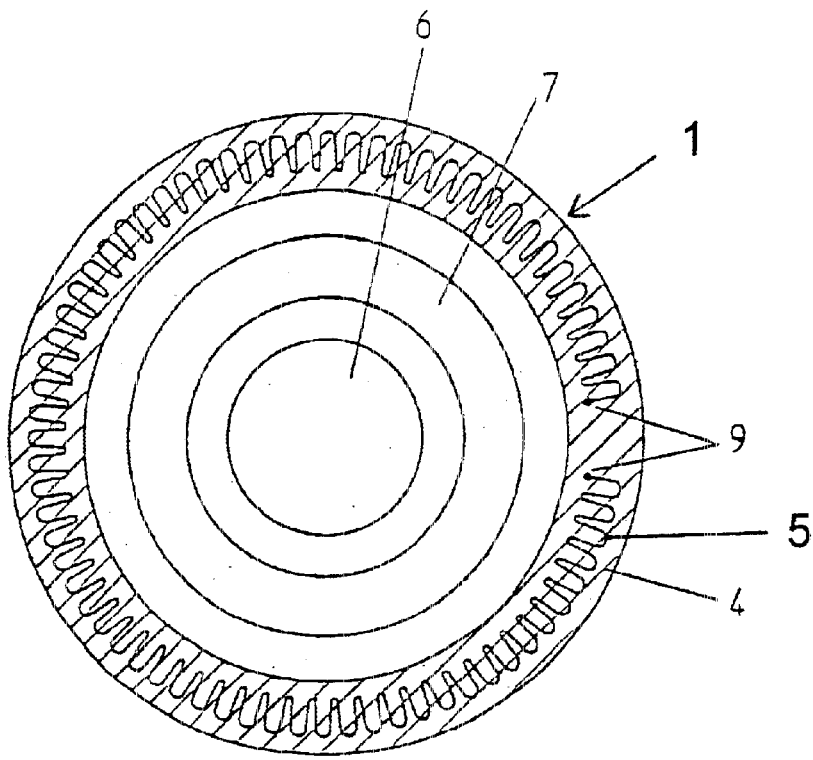
Figure 4:
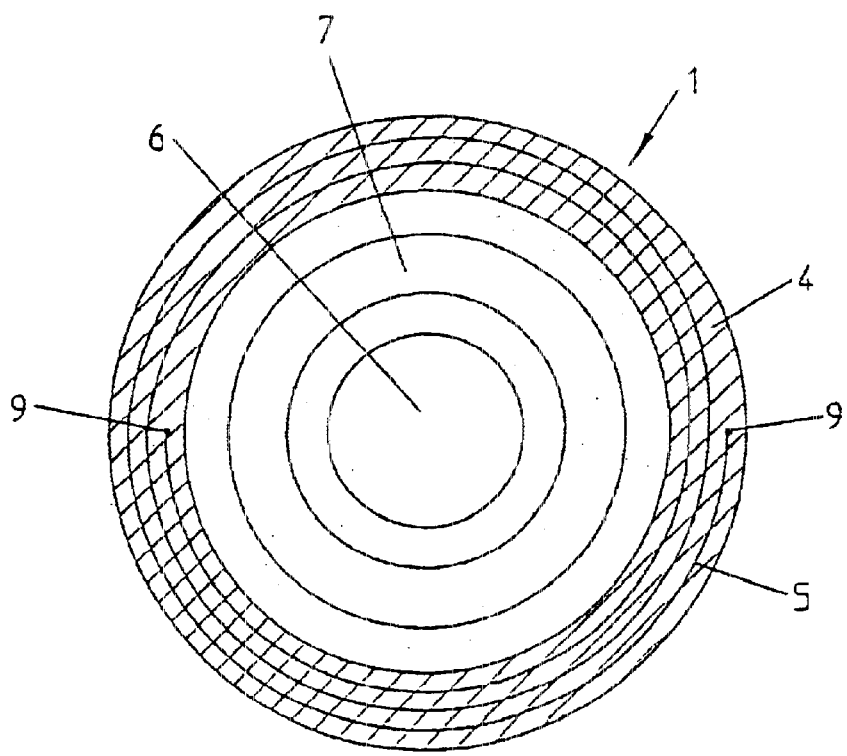

Other features and advantages of the invention will emerge from the following description of an exemplary embodiment, which makes reference to the attached drawings. Shown in the figures are:

FIG. 1 a pressure-measuring cell in an axial section;

FIGS. 2 to 4 sections through the pressure-measuring cell of FIG. 1, along plane A—A.

FIG. 1 shows the pressure-measuring cell according to the invention, in an initial section. The pressure-measuring cell comprises a essentially cylindrical base 1 and a diaphragm 2, each made of a ceramic material, which are held apart by a material layer 4 that runs in circular fashion along the rims of the facing sides of the base 1 and the diaphragm 2. The material layer 4 consists of a glass material. Jointly with the base 1 and the diaphragm 2 it tightly encloses a flat, cylindrical compartment 3. In the area of the compartment 3 the face of the base 1 bears a centrally positioned electrode 6 and a circular electrode 7 concentric to it. Feed-through contacts 9 connect the two electrodes with the connecting areas 10 on the back of the base 1. On the opposite side of the compartment 3 the diaphragm 2 bears an opposing electrode 8, which is not provided with a contact. The diaphragm 2 is deformed by the pressure of a medium acting on its outer surface 11. Deformation of the diaphragm modifies the capacity of the capacitor formed by the electrodes 6, 7, 8, so that conclusions concerning the pressure acting on the outer surface 11 can be reached by measuring this capacity—for example, through the installation of a pressure-measuring cell as the capacitor in an oscillating circuit and through the measurement of the latter's resonant frequency.

Embedded in the material layer 4 that functions as a seal for the compartment 3 is a resistor element 5 with a temperature-dependent resistance value. The two opposite ends of the extended resistor element 5 are connected to the connection areas 10 on the back of the base 1 by means of feed-through contacts 9.

In the embodiment shown in FIG. 1 the resistor element 5 is in direct contact with the surface of the base 1 and is separated from the diaphragm 2 by a portion of the material layer 4. The direct application of the resistor element 5 to the base 1 facilitates the production of an electrical connection between the resistor element and the surrounding area by means of the feed-through contacts 9. The surface of the resistor element 5 that faces away from the base 1 forms a large heat exchange area with the material layer 4 and, through it, with the diaphragm 2 and the medium (not shown) that exerts the pressure that is being measured on the diaphragm.

The pressure-measuring cell can be produced in a simple way by first forming the temperature-dependent resistor element 5 on the base 1 by means of a thick-layer or a thin-layer method; a precursor material for the material layer should then be applied to the resistor element 5, and the diaphragm 2 should then be positioned on the precursor material. By heating and glazing the precursor material the glass-like material layer 4 that is formed as a result comes into intimate contact with the base 1 and the resistor element 5, on the one side, and with the diaphragm, on the other side; and this both guarantees the tightness of the compartment 3 against the medium whose pressure is being measured and facilitates a highly efficient heat exchange from the diaphragm 2 in contact with the medium to the resistor element by way of the material layer 4.

Depending on the measuring range provided for the pressure-measuring cell or on the necessary strength of the diaphragm 2, the distance between the outer area 11 of the diaphragm and the resistor element 5 will typically be 0.1 to 3, ideally 0.2 to 2 mm.

Based on sections along the plane A—A, FIGS. 2 to 4 depict different embodiments of the temperature-dependent resistor element 5 functioning as a temperature sensor. Visible in the top view of FIG. 2 is the central electrode 6 and the circular electrode 7 of the base 1 and, positioned concentric thereto, the material layer 4 on the rim of the base 1. In the interior of the material layer 4 the temperature-dependent resistor element 5 runs over almost the entire circumference of the base 1, with the exception of the distance separating the two feed-through contacts 9, which serve to supply the resistor element with a measuring current.

In the embodiment of the pressure-measuring cell shown in FIG. 3 the temperature-dependent resistor element 5 runs in a meandering or zigzag path over almost the entire circumference of the base 1, from one of the two feed-through contacts 9 to the other. This embodiment makes it possible to house a resistor element 5 whose extended length is considerably greater than the circumferential length of the base, a resistor element 5 that exhibits a high resistance value and a correspondingly strong change in the resistance value with the temperature.

In the embodiment shown in FIG. 4 the temperature-dependent resistor element 5 runs over a spiral path inside the material layer 4. In this configuration also the extended length of the resistor element 5 can reach a multiple of the circumferential length of the base 1. The special feature of this embodiment is that it permits a largely arbitrary positioning of the feed-through contacts 9 on the base 1, e.g., at diametrically opposite positions as shown in FIG. 4, inasmuch as the length that the resistor element can reach is not proportional here to the angular separation of the two feed-through contacts 9.

The principle described here is naturally not restricted to a pressure-measuring cell of the capacitive type depicted in the figures. It can also be applied to a DMS measuring cell, or generally to any type of pressure-measuring cell which exhibits a base, as well as a diaphragm that is placed at distance from the base and that is deformed by the pressure being measured.

List of Reference Numerals 1 base
2 diaphragm
3 compartment
4 seal
5 resistor element
6 central electrode
7 circular electrode
8 opposite electrode
9 feed-through contact
10 connection area
11 outer surface

What is claimed is:

1. A pressure-measuring cell comprising:

a base (1);

a diaphragm (2), carried by the base (1), and that is deformed by a pressure being measured; and a temperature sensor, positioned between the diaphragm (2) and the base (1), wherein the distance between the temperature sensor and an outer surface (11) of the diaphragm (2) exposed to the pressure being measured is between 0.1 mm and 3 mm.

2. A pressure-measuring cell comprising:

a base (1);

a diaphragm (2), carried by the base (1), and that is deformed by a pressure being measured; and a temperature sensor, positioned between the diaphragm (2) and the base (1), wherein the temperature sensor comprises a resistor element (5) with a temperature-dependent resistance value.

3. A pressure-measuring cell according to claim 2, wherein the resistor element (5) extends over virtually the entire circumference of the material layer (4).

4. A pressure-measuring cell according to claim 2, wherein the resistor element (5) runs in meandering fashion.

5. A pressure-measuring cell comprising:

a base (1);

a diaphragm (2), carried by the base (1), and that is deformed by a pressure being measured; and a temperature sensor, positioned between the diaphragm (2) and the base (1), wherein the temperature sensor is embedded in a material layer (4) connecting the base (1) and the diaphragm (2).

6. A pressure-measuring cell according to claim 5, wherein the material layer (4) is seal that seals a compartment (3) formed between the base (1) and the diaphragm (2).

7. A pressure-measuring cell according to claim 5, wherein the base (1) and the diaphragm (2) are made of a ceramic material and the material layer (4) is made of a glass.

8. A pressure-measuring cell according to claim 5, wherein said cell is a wire strain gauge or elongation measuring strip.

9. A pressure-measuring cell according to claim 5, wherein said cell is a capacitive measuring cell.

10. A pressure-measuring cell according to claim 5, wherein the base (1) or the diaphragm (2) is made of a ceramic material and the material layer (4) is made of a glass.

* * * * *

UNITED STATES PATENT AND TRADEMARK OFFICE
CERTIFICATE OF CORRECTION

PATENT NO. : 6,681,637 B2
DATED : January 27, 2004
INVENTOR(S) : Jacob et al.

It is certified that error appears in the above-identified patent and that said Letters Patent is hereby corrected as shown below:

<u>Column 4,</u>
Line 25, change "the material layer" to -- a material layer --.

Signed and Sealed this

Eighth Day of June, 2004

JON W. DUDAS
*Acting Director of the United States Patent and Trademark Office*